UNITED STATES PATENT OFFICE.

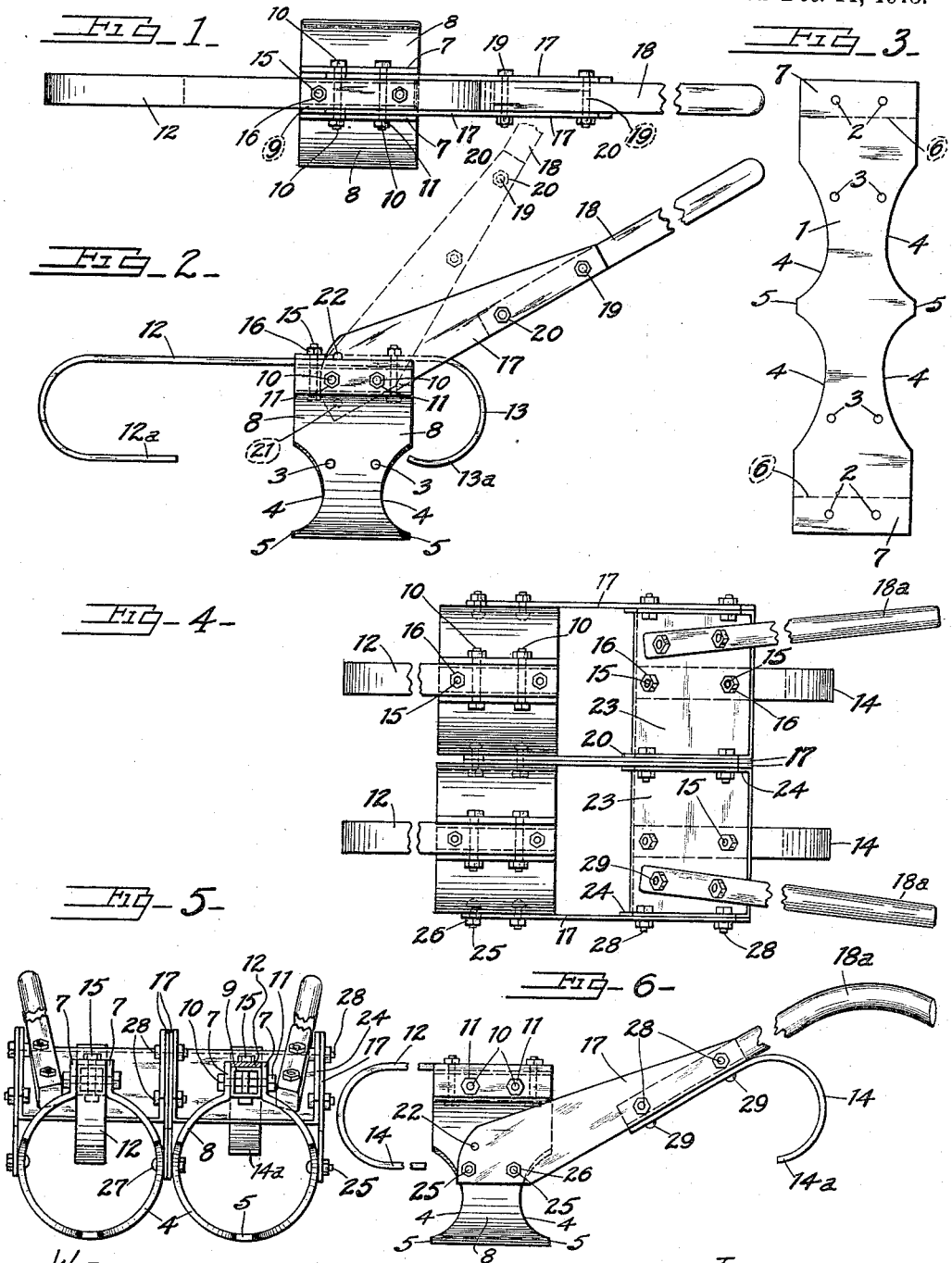

PETER HANSEN, OF CHICAGO, ILLINOIS.

COMBINED WEEDER AND CULTIVATOR.

1,163,660. Specification of Letters Patent. Patented Dec. 14, 1915.

Application filed August 27, 1915. Serial No. 47,629.

*To all whom it may concern:*

Be it known that I, PETER HANSEN, a citizen of the United States, and a resident of Chicago, county of Cook, and State of Illinois, have invented certain new and useful Improvements in a Combined Weeder and Cultivator.

This invention relates to devices which are used for destroying weeds and it also relates to devices which are used for breaking the surface of the ground into small particles, the term cultivator being usually applied to devices designed to so break up the ground.

The object of the invention is to obtain a device designed to be propelled by hand which is light in weight and which is easily handled, requiring no particular skill on the part of the person using the same; which is durable, not liable to get out of order or break, and which is economically made.

The further object is to obtain a device which is adapted for small work, that is, in a garden where there is not a great deal of space between the rows of growing plants, and a device which can be increased in size by increasing the number of individual members forming the same.

In the drawing accompanying and forming a part of this specification Figure 1, is a top plan view of the combined weeder and cultivator embodying the invention, as applied to a single member. Fig. 2, is a side elevation of the device which is illustrated in Fig. 1. Fig. 3 represents a sheet metal blade which is rolled or formed into nearly cylindrical form, which constitutes a member of the device. Fig. 4 is a top plan view of a device embodying the invention and comprising duplicate members. Fig. 5, is an end elevation of the device which is illustrated in Fig. 4, and Fig. 6 is a side elevation of said device.

A reference character applied to designate a given part indicates said part throughout the several figures of the drawing wherever the same appears.

1, (Fig. 3), represents a sheet metal blank which is provided with apertures or holes 2 and 3. The sides of the sheet metal blank 1, are cut away to form the curved lines 4 on the side edges of said sheet, and thereby I obtain what may be termed the cutting blade 5. This sheet 1, is formed into a substantially cylindrical form except that the bend 6 is made, to obtain the parallel plates 7. The cylindrical portion of sheet 1, when the said sheet is formed up, is lettered 8 in Figs. 1, 2, 4, 5, and 6.

9 is a block having parallel sides which is secured between the parallel plates 7 by bolts 10. Bolts 10 extend through apertures 3 in said plate and through similar apertures in the sides of block 9 and said bolts are provided with nuts 11.

12 and 13 represent, respectively, what are termed a combined harrow tooth and guide. The harrow teeth and guides 12 and 13 are secured in position on block 9 by bolts 15 which extend through an aperture provided therefor in said harrow tooth and said block. Said bolt is provided with the nut 16. The combined harrow tooth and guide 14, in the construction which is illustrated in Figs. 4, 5, and 6, is secured by like bolts 15 and nut 16 to a plate 23 about to be described.

17 are plates which are secured in place, in the construction illustrated in Figs. 1 and 2, by the bolts 10 and nuts 11, to the sides of the parallel plates 7; and 18 is a handle which is secured between the plates 17 by bolts 19 and nuts 20 thereon.

21 and 22 (Fig. 2) are apertures in plates 17 through one of which a bolt 10 (at the left hand end of the plate 17, as illustrated in Figs. 1 and 2), may extend and the angle of said plate 17 and handle 18 relative to the block 9, blade portion 7 and cylindrical portion 8 of the device is determined by the one of said apertures 21, 22, through which said bolt extends. The pre-determined relative position of the cultivator and handle referred to, is thus provided for. Plate 23 is turned up at its ends to obtain a U-shaped plate. Said upturned end being identified by the numeral 24 in Figs. 4, 5 and 6.

Where the device embodying a plurality of cylindrical members 8 is to be constructed, or built up, the plates 17 are attached to the cylindrical member 8, on the side thereof, by bolts 25 and nuts 26, and adjacent plates 17 (see Figs. 4 and 5) are secured together and to said cylindrical member 8 by bolts 27, 28, and said bolts 28 in addition to securing said plates 17 together also secure the U-shaped plates firmly in place between said plates 17. In this construction I attach the handles 18ª to the plates 23 by bolts 29.

It will be observed that the several bolts 10, 15, 19, 25, 27, 28 and 29 are substantially the same, and the different numerals are applied thereto simply for purposes of description, and the nuts on said bolts are the ordinary screw threaded nuts which are applied to bolts of this character.

In the construction illustrated in Figs. 4, 5 and 6 the upper end of the handles are curved (see Fig. 6) while in the construction illustrated in Figs. 1 and 2 said handles are straight the entire length thereof.

The operation of this device is as follows: A person desiring to use it grasps the handle or handles thereon and moves it to and fro on the ground. The ends 12ª, 13ª, respectively, of the combined harrow tooth and guides 12, 13 and 14, determine the depth to which cylindrical member 8 penetrates the ground. The said cutting blade 5 and curved edges 4 cut any weeds, or the roots thereof, with which said blade and edges are brought into contact; thus weeding the ground. In practice I find the several ends 12ª, 13ª and 14ª of the combined harrow teeth and guides penetrate a short distance into the ground so as to pulverize or cultivate the surface thereof to some, and a beneficial extent.

When the handle (18) is adjusted in the position which is indicated by broken lines in Fig. 2 the cutting blade 5 and curved part 4 which is at the right hand end of the cylindrical part 8 of the device, as illustrated in said Fig. 2, may be made to perform the function of an ordinary hoe with the harrow tooth 13 forming a guide or guard determining the depth to which said cutting blade and curved part 4 will penetrate the ground. When the handle 18 is in position as indicated by said broken lines in Fig. 2 the said guard 13 may be removed if preferred.

I claim:—

1. In a combined weeder and cultivator, a cylindrical body provided with plates, in parallel planes, a block secured between said plates in combination with additional plates, and combined harrow and guide teeth, and means to secure said additional plates and said teeth to said block, the ends of said teeth in substantially horizontal planes, which are adapted to determine the distance to which said cylindrical body will penetrate the ground, and a handle secured to said additional plates.

2. In a combined weeder and cultivator, a cylindrical body provided with cutting edges at the ends thereof, and with curved cutting edges, on the sides of said ends, in combination with blocks secured to said cylindrical body, plates secured to said blocks, a handle, means to secure said handle to said cylindrical body, curved teeth and means to secure said teeth to said cylindrical body to form guides to determine the depth, which said cylindrical body penetrate the ground, said teeth adapted to cultivate the surface of said ground.

3. In a combined weeder and cultivator, a plurality of cylindrical sheet metal plates integral therewith and extending in parallel planes, a block secured between said plates, additional plates, means to attach said additional plates to said cylindrical body, and said attaching means adapted to join adjacent ones of said additional plates, in combination with handles, means to connect said additional plates, means to attach said handles, and means, comprising a combined harrow tooth and guide, to determine the depth which said cylindrical body penetrates the ground.

PETER HANSEN.

In the presence of—
 CHARLES TURNER BROWN,
 HELYN MULDOWNEY.

Copies of this patent may be obtained for five cents each, by addressing the "Commissioner of Patents, Washington, D. C."